(12) United States Patent
Lee (10) Patent No.: US 9,475,159 B2
(45) Date of Patent: Oct. 25, 2016

(54) RIB STRUCTURE FOR A TURNING CENTER BED

(75) Inventor: Sang Kyo Lee, Gyeonggi-Do (KR)

(73) Assignee: Doosan Infracore Co., Ltd., Incheon (KR)

( * ) Notice: Subject to any disclaimer, the term of this patent is extended or adjusted under 35 U.S.C. 154(b) by 266 days.

(21) Appl. No.: 13/821,127

(22) PCT Filed: Sep. 2, 2011

(86) PCT No.: PCT/KR2011/006521
§ 371 (c)(1),
(2), (4) Date: Mar. 6, 2013

(87) PCT Pub. No.: WO2012/033309
PCT Pub. Date: Mar. 15, 2012

(65) Prior Publication Data
US 2013/0160619 A1    Jun. 27, 2013

(30) Foreign Application Priority Data
Sep. 6, 2010 (KR) .................. 10-2010-0086815

(51) Int. Cl.
| | | |
|---|---|---|
| B23B 17/00 | (2006.01) | |
| B23Q 1/01 | (2006.01) | |
| B23Q 11/00 | (2006.01) | |
| B23Q 11/14 | (2006.01) | |

(52) U.S. Cl.
CPC ........... B23Q 1/015 (2013.01); B23Q 11/0003 (2013.01); *B23Q 1/01* (2013.01); *B23Q 11/14* (2013.01); *Y10T 82/2566* (2015.01)

(58) Field of Classification Search
CPC .... B23Q 1/01; B23Q 11/14; B23Q 11/0032; B23Q 11/0003; B23Q 1/015; B13Q 1/017

USPC .......... 82/121, 142, 149, 158; 409/235, 238; 248/637–639
See application file for complete search history.

(56) References Cited

U.S. PATENT DOCUMENTS 1,528,971 A * 3/1925 Groene .......................... 82/117
1,926,997 A * 9/1933 Hoelscher et al. ............. 82/149
(Continued)

FOREIGN PATENT DOCUMENTS

| CN | 101077557 A | 11/2007 |
| CN | 101653909 A | 2/2010 |

(Continued)

OTHER PUBLICATIONS

Search Report dated Apr. 4, 2012 and written in Korean for International Application No. PCT/KR2011/006521 filed Sep. 2, 2011, 3 pages.

(Continued)

Primary Examiner — Sara Addisu
(74) Attorney, Agent, or Firm — John D. Veldhuis-Kroeze; Westman, Champlin & Koehler (57) ABSTRACT

The present disclosure provides a bed for use with a turning center assembled with a main shaft housing in which a work piece is chucked, a turret and a tool table configured to process the work piece by a tool, and a transfer apparatus configured to transfer the turret and the tool table. The bed includes: a rib including a plurality of rib elements, in which the rib element includes a first rib element positioned at a lower portion of the bed where the main shaft housing is assembled, and a second rib element positioned at a lower portion of the bed where the transfer apparatus is assembled.

3 Claims, 7 Drawing Sheets

(56) References Cited

U.S. PATENT DOCUMENTS

| | | | | |
|---|---|---|---|---|
| 1,951,514 A | * | 3/1934 | Lovely | 82/149 |
| 1,966,409 A | * | 7/1934 | Hoelscher | 82/148 |
| 3,011,373 A | * | 12/1961 | Waldrich | 82/149 |
| 3,523,343 A | * | 8/1970 | Mitchell | 425/88 |
| 3,837,245 A | * | 9/1974 | Schuler et al. | 82/149 |
| 4,478,117 A | * | 10/1984 | Brown et al. | 82/149 |
| 4,539,876 A | * | 9/1985 | Myers et al. | 82/149 |
| 4,545,271 A | * | 10/1985 | Romi | 82/149 |
| 7,104,169 B2 | * | 9/2006 | Inada et al. | 82/149 |
| 7,503,244 B2 | * | 3/2009 | Nakamura et al. | 82/149 |
| 8,683,897 B2 | * | 4/2014 | Schneider et al. | 82/149 |
| 2002/0011137 A1 | * | 1/2002 | Nakaminami et al. | 82/117 |

FOREIGN PATENT DOCUMENTS

| | | | |
|---|---|---|---|
| JP | 56045306 A | * | 4/1981 |
| JP | 56045344 A | * | 4/1981 |
| JP | 10-315097 | | 12/1998 |
| JP | H10315097 A | | 12/1998 |
| JP | 2000-135640 | | 5/2000 |
| JP | 2004-066437 | | 3/2004 |
| JP | 2004-136395 | | 5/2004 |

OTHER PUBLICATIONS

Chinese Office Action dated Jul. 21, 2014 for corresponding Chinese Application No. 201180042867.8, 5 pages.

* cited by examiner

RIB STRUCTURE FOR A TURNING CENTER BED

This Application is a Section 371 National Stage Application of International Application No. PCT/KR2011/006521, filed Sep. 2, 2011 and published, not in English, as WO2012/033309 on Mar. 15, 2012.

FIELD OF THE DISCLOSURE

The present disclosure relates to a machine tool bed, and more particularly, to a bed rib structure of a turning center.

BACKGROUND OF THE DISCLOSURE

Figure 1:
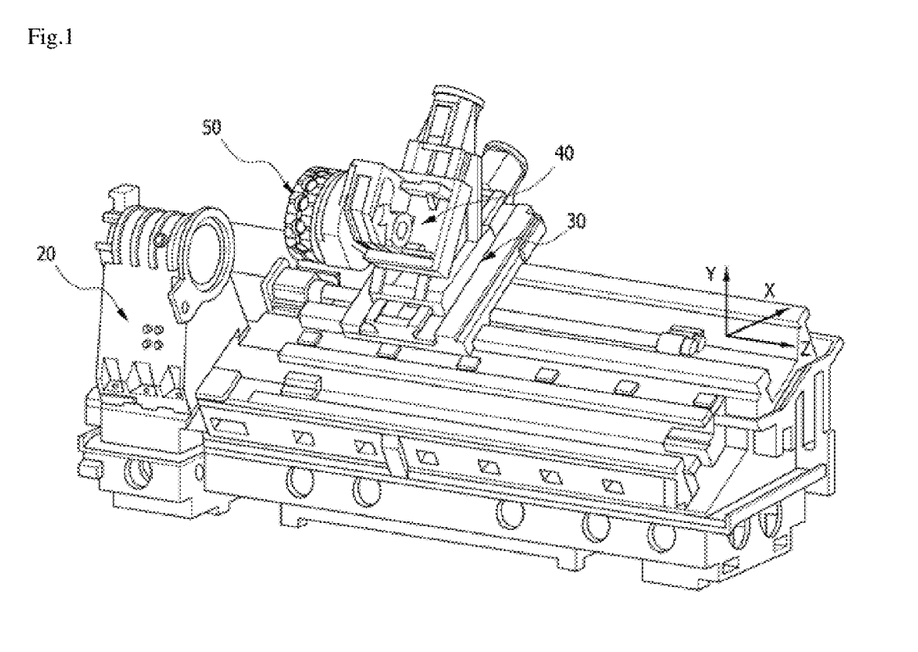
FIG. 1 is an assembly view of a structure of a turning center.

A machine tool, particularly, a bed of a turning center is manufactured by a casting forming method, and as illustrated in FIG. 1, a main shaft housing 20 in which a work piece is chucked, a turret 40 and a tool table 50 for processing the work piece by a tool, a transfer system or a transfer apparatus 30 for transferring the turret 40 and the tool table 50 for each axis (X, Y, Z) direction are assembled at an upper portion of a bed 10.

Figure 2A:
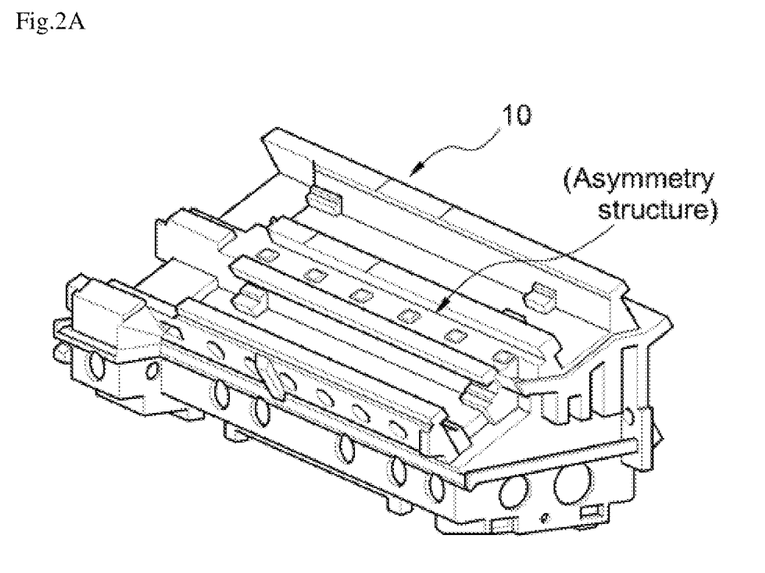
FIG. 2A is a view for explaining an asymmetric structure of a bed of a turning center.

In a case of a general machining center, because the machining center has a symmetric structure, a control for thermal displacement of the structure according to a change in external temperature may be compensated in real time, but as illustrated in FIG. 2A, because the bed 10 of the turning center has an asymmetric structure in shape, and particularly, since positions of the transfer apparatus 30 and the main shaft housing 20 form an asymmetric structure, the real time compensation is difficult and static stiffness according to an action direction of maximum cutting force needs to be secured. Further, there is a rib in the bed 10, and a general shape of the rib of the bed is designed to be a rectangular box shape, and the rib is designed so that an interval of the rib is adjusted in accordance with a weight of an assembly at an upper portion of the bed.

Figure 2B:
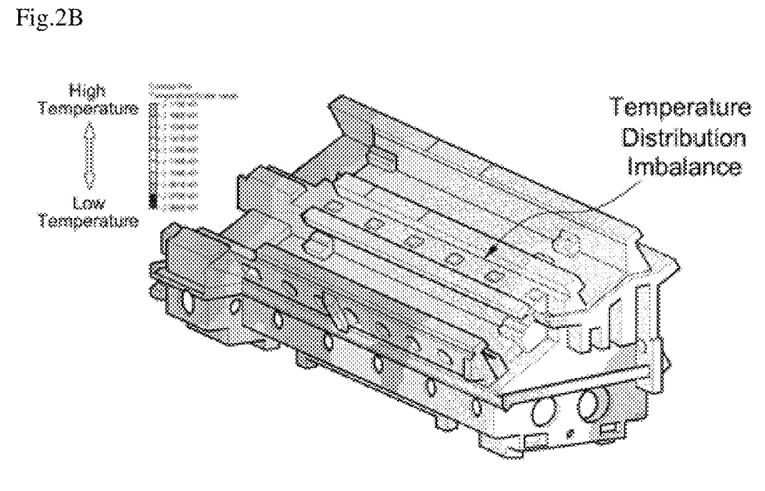
FIG. 2B is a view for explaining unbalanced temperature distribution of a bed of a turning center.

As illustrated in FIG. 2B, because of the asymmetric structure of the turning center, thermal deformation according to a change in external temperature shows a shape in which a linear mode and a nonlinear mode are combined, and nonlinear deformation makes a control for thermal displacement of the turning center difficult. In addition, in a load condition considering a condition of the maximum cutting force, a static stiffness characteristic is also not good.

Figure 3A:
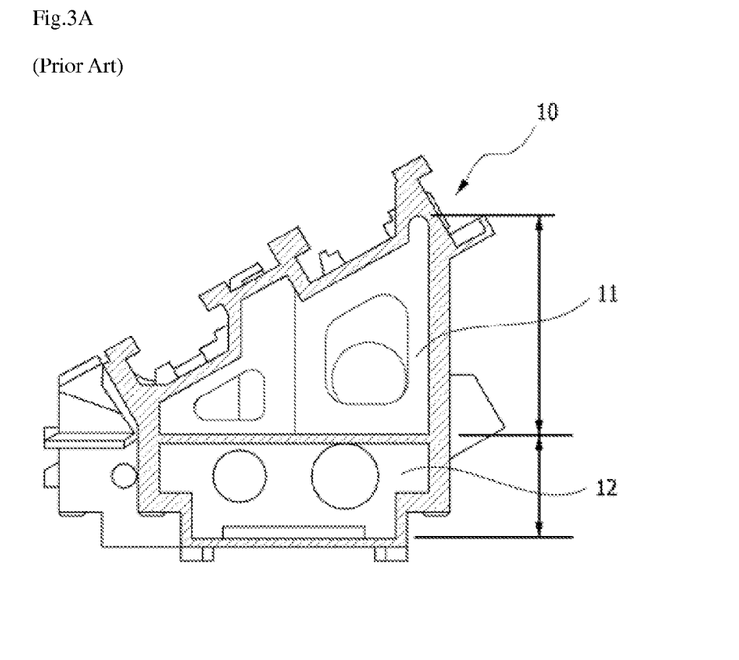
FIGS. 3A and 3B are views illustrating a structure of a bed of a turning center according to the related art.
Figure 3B:
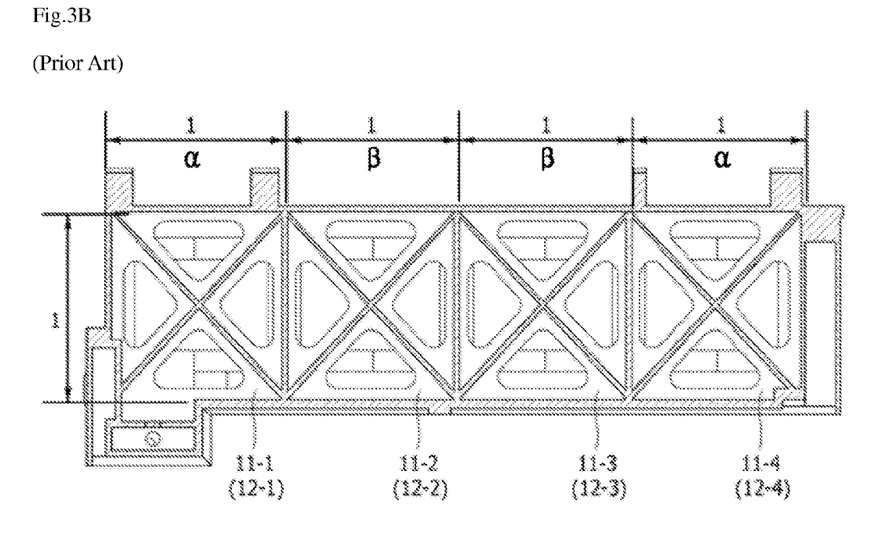

FIGS. 3A and 3B illustrate a shape of the bed of the turning center and a shape of the rib in the bed of the related art.

Because the shape of the bed 10 of the turning center of the related art is designed considering only the static stiffness in the condition of the maximum cutting force without considering an influence of the change in external temperature, as illustrated in FIG. 3A, the bed 10 of the turning center of the related art has an upper and lower two stage structure including an upper bed 11 and a lower bed 12, and as illustrated in FIG. 3B, the bed 10 has an equal interval shape in which a ratio of intervals of rib elements 11-1(12-1), 11-2(12-2), 11-3(12-3), and 11-4(12-4) in the bed 10 is 1:1:1:1.

However, in the bed structure of the turning center of the related art, a relative thermal displacement amount at end points of the work piece and the tool shows a considerably high value (for example, 20 to 30 μm) in accordance with a test condition, and a higher thermal deformation amount is shown in a high speed and high precision processing condition.

One of methods for reducing a temperature gradient of a machine tool bed and the thermal displacement due to the temperature gradient is a method of improving a material of the machine tool bed such as a method of using a casting material having an excellent thermal characteristic. However, there is a problem in that the above method causes a heavy burden in terms of cost, and the thermal displacement due to occurrence of a local temperature gradient according to a change in thermal environment may not be basically and greatly reduced by only the above countermeasure.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter, nor are they intended to be used as an aid in determining the scope of the claimed subject matter.

The present disclosure has been made in an effort to solve the above problem in the related art, and one aspect of the present disclosure is to provide a shape of a bed of a turning center capable of improving processing accuracy by allowing a temperature response speed at each portion of the bed of the turning center to be uniform, thereby reducing thermal displacement due to occurrence of a local temperature gradient.

The present disclosure has been made to suggest a shape of a rib of a bed, in which thermal deformation of a turning center due to a change in external temperature may be reduced, and relative displacement at end points of a tool and a work piece may be reduced by securing static stiffness in a condition of maximum cutting force, by utilizing a topology optimization method, and improve processing quality.

Specifically, the present disclosure provides a bed 10 A bed 10 for use with a turning center assembled with a main shaft housing 20 in which a work piece is chucked, a turret 40 and a tool table 50 configured to process the work piece by a tool, and a transfer apparatus 30 configured to transfer the turret 40 and the tool table 50, the bed 10 comprising: a rib 13 including a plurality of rib elements 13-1, 13-2, 13-3, and 13-4.

Further, the rib element comprises a first rib element 13-1 positioned at a lower portion of the bed 10 where the main shaft housing 20 is assembled, and a second rib element 13-2 positioned at a lower portion of the bed 10 where the transfer apparatus 30 is assembled, and an interval $\alpha$ of the first rib element 13-1 is smaller than an interval $\beta$ of the second rib element 13-2.

According to a result of optimization by a topology optimization method, the interval $\alpha$ of the first rib element 13-1 and the interval $\beta$ of the second rib element 13-2 is $0.5<\alpha<0.6$ and $1.37<\beta<1.55$, and static stiffness in a radial direction (x-axis) of the work piece is maximized (25% improvement), and thermal deformation is also minimized (10% reduction).

Meanwhile, the rib elements 13-1, 13-2, 13-3, and 13-4, which constitute the bed 10, may be manufactured to have a left and right symmetric shape.

That is, the rib element further includes a third rib element 13-3 and a fourth rib element 13-4, which are disposed adjacent to the second rib element 13-2, an interval of the third rib element 13-3 is identical to the interval β of the second rib element 13-2, and an interval of the fourth rib element 13-4 is identical to the interval α of the first rib element 13-1, and thereby the rib element may have a left and right symmetric shape, as a whole.

In addition, the rib 13 may be an integrated single structure.

According to the present disclosure, by adjusting, by the topology optimization method, the interval α of the first rib element 13-1 positioned at a lower portion of the bed 10 where the main shaft housing 20 is assembled and the interval β of the second rib element 13-2 positioned at a lower portion of the bed 10 where the transfer apparatus 30 is assembled, among the rib elements, so as to improve a temperature response speed at a portion where thermal resistance is high, occurrence of a local temperature gradient may be prevented by allowing a temperature response speed at each portion of the bed to be uniform as a whole, and accordingly, processing accuracy by reducing thermal displacement.

Particularly, in a case in which the relative ratio between the interval α of the first rib element 13-1 and the interval β of the second rib element 13-2 is $0.5<\alpha<0.6$ and $1.37<\beta<1.55$, the static stiffness in a radial direction (x-axis) of the work piece is maximized (25% improvement), and the thermal deformation is also minimized (10% reduction).

10: Bed
11: Upper bed
12: Lower bed
11-1 to 11-4 (12-1 to 12-4): Rib element
13: Rib
13-1 to 13-4: First to fourth rib elements
20: Main shaft housing
30: Transfer system (transfer apparatus)
40: Turret
50: Tool table
α: Interval of first rib element
β: Interval of second rib element

DETAILED DESCRIPTION

Hereinafter, an exemplary embodiment of the present disclosure will be described in detail with reference to the accompanying drawings.

According to the present disclosure, in order to reduce thermal deformation in a turning center according to a change in external temperature and improve static stiffness for a high speed and high precision processing in a condition of maximum cutting force, an optimum bed rip shape, which secures sufficient stiffness in a direction in which maximum cutting force is applied and minimizes relative thermal displacement at end points of a tool and a work piece according to a change in external environmental temperature, is derived by topology optimization.

Figure 4A:
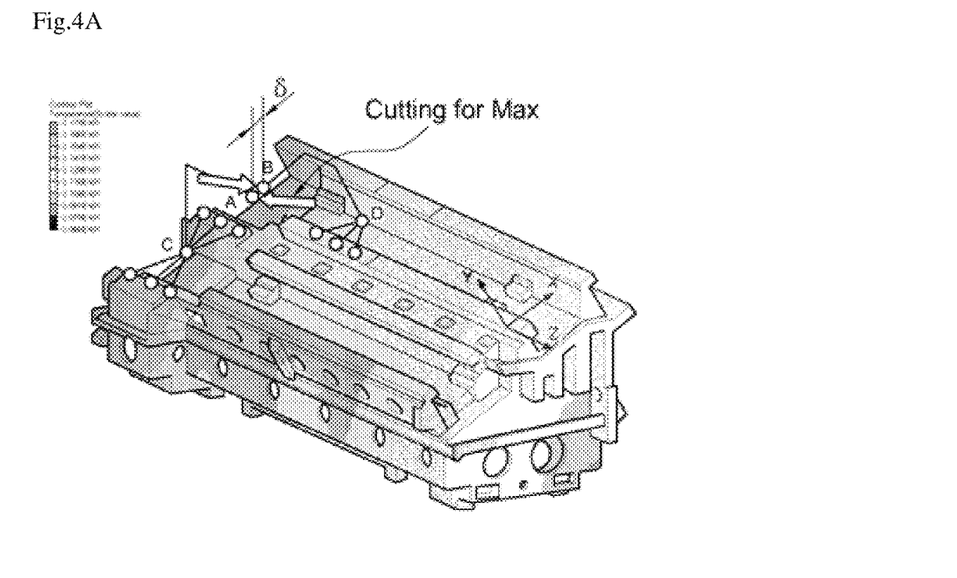
FIGS. 4A and 4B are views for explaining an application principle of topology optimization and a design region according to the present disclosure.
Figure 4B:
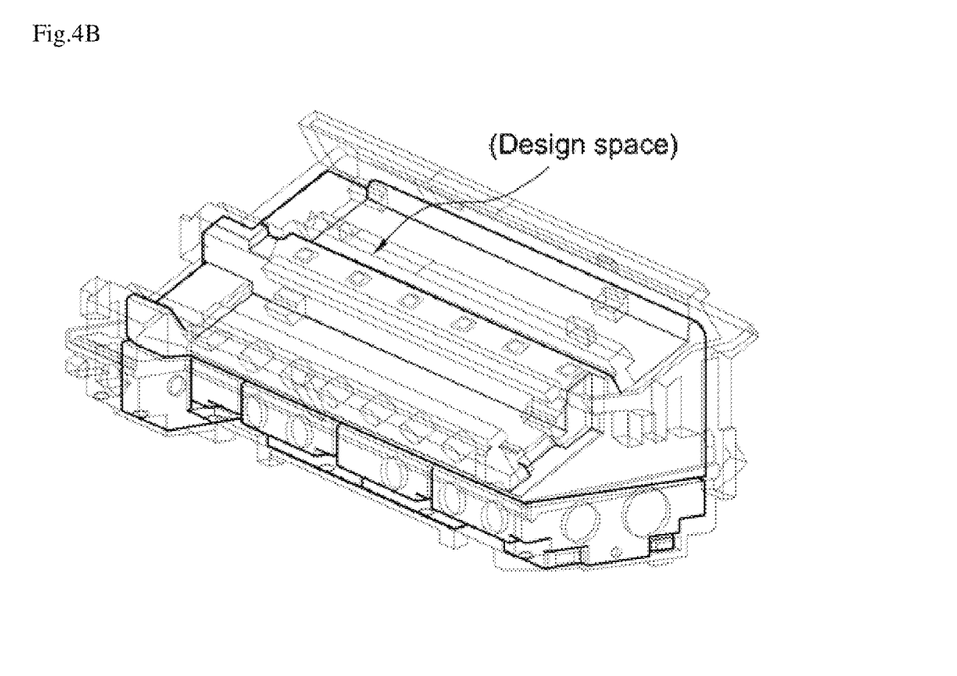

FIGS. 4A and 4B are views for explaining an application principle of topology optimization and a design region according to the present disclosure.

As illustrated in FIGS. 4A and 4B, when setting aside installation spaces C and D of structures (a main shaft housing, a transfer apparatus, a turret, a tool table and the like) installed at a bed, a surplus region of an internal space of the bed where relative displacement δ is minimized by controlling the relative displacement δ at an end point B of the tool and an end point A of the work piece is defined as a design space.

Figure 5A:
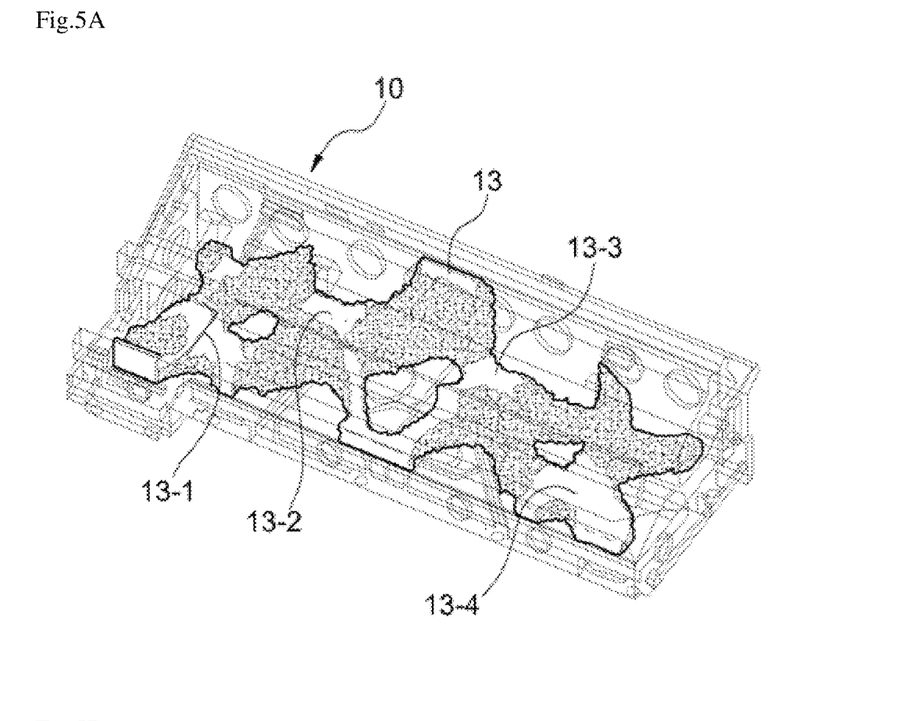
FIGS. 5A and 5B are views illustrating a process of topology optimization in a design region defined by a considered external environmental temperature and a condition of maximum cutting force.
Figure 5B:
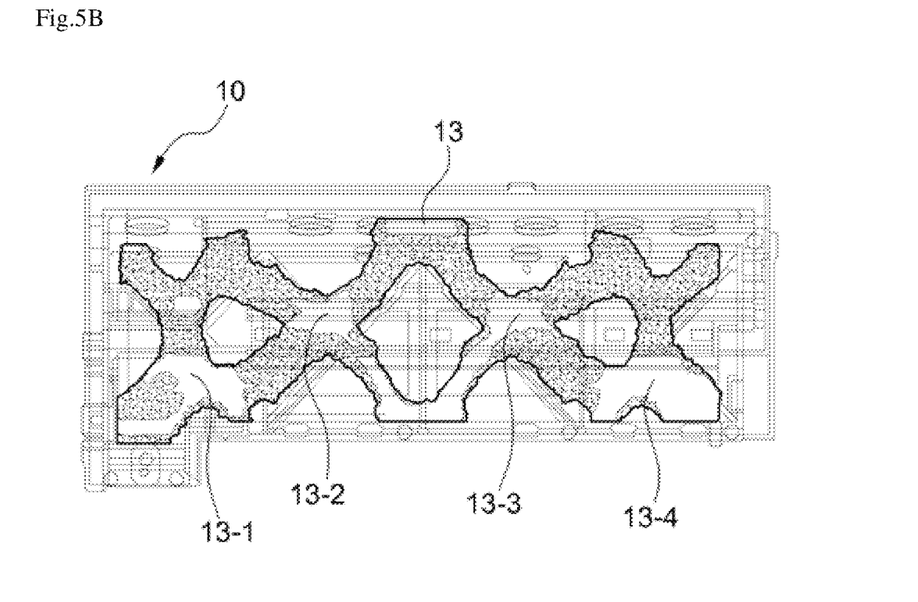

FIGS. 5A and 5B illustrate a process of topology optimization in a design region defined by a considered external environmental temperature and a condition of maximum cutting force.

As illustrated, relative intervals of a first rib element 13-1, a second rib element 13-2, a third rib element 13-3, and a fourth rib element 13-4, which constitute a rib 13 in a bed 10, are optimally designed through the process of the topology optimization.

Figure 6A:
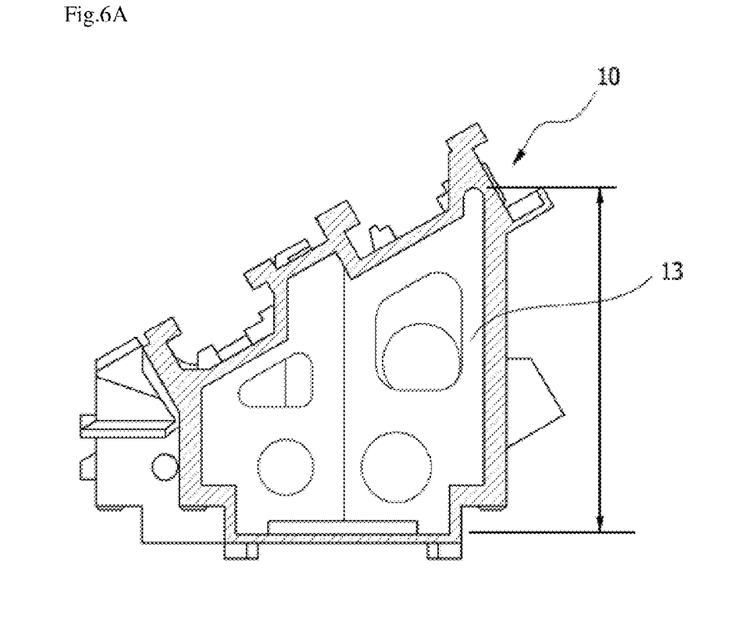
FIGS. 6A and 6B are views illustrating a structure of a bed of a turning center of the present disclosure, which is designed by applying topology optimization.
Figure 6B:
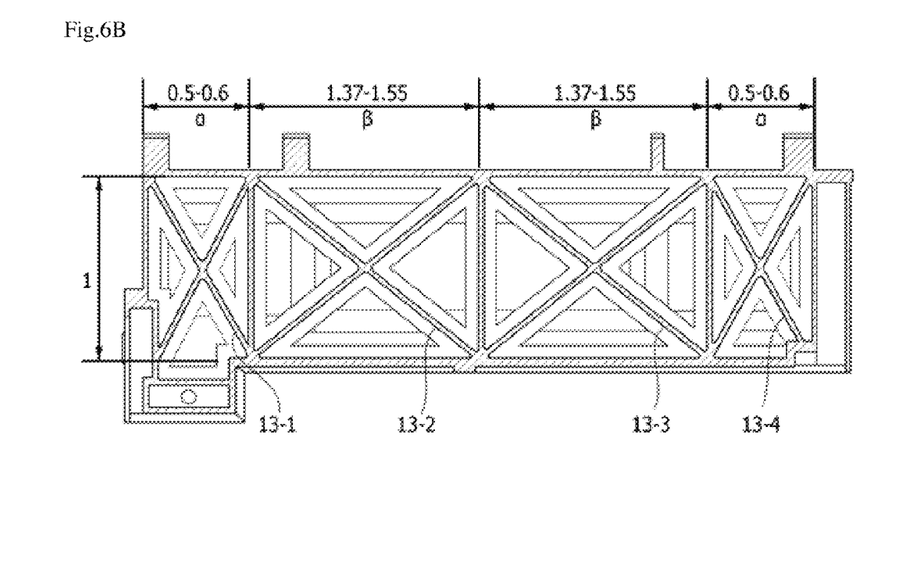

FIGS. 6A and 6B illustrate a shape of the bed 10 and a shape of the rib 13 in the bed 10 which are derived through the process of the topology optimization of FIGS. 5A and 5B.

As illustrated in FIG. 6A, unlike the upper and lower two stage structure (see FIG. 3A) of the related art, a structure of the rib 13 of the bed 10 according to the present disclosure is an integrated single structure.

In addition, as illustrated in FIG. 6B, among the first to fourth rib elements 13-1, 13-2, 13-3, and 13-4 which constitute the rib 13, an interval of the first rib element 13-1, which is positioned at a lower portion of the bed 10 where a main shaft housing 20 is assembled, is defined as α, and an interval of the second rib element 13-2, which is positioned at a lower portion of the bed 10 where the transfer apparatus 30 is assembled, is defined as β.

In this case, as illustrated in FIG. 6B, it may be confirmed that when a relative ratio between the interval α of the first rib element 13-1 and the interval β of the second rib element 13-2 is $0.5<\alpha<0.6$ and $1.37<\beta<1.55$, maximum thermal deformation with respect to a change in external temperature is reduced, and maximum bed static stiffness in a condition of maximum cutting force is secured.

Further, it may be confirmed that in a case in which the rib 13 is designed in a left and right symmetric shape, as a whole, maximum thermal deformation with respect to a change in external temperature is reduced, and maximum bed static stiffness at a condition of maximum cutting force is secured, by setting an interval of the third rib element 13-3 adjacent to the second rib element 13-2 to be identical to the interval β of the second rib element 13-2 and setting an interval of the fourth rib element 13-4 adjacent to the third rib element 13-3 to be identical to the interval α of the first rib element 13-1.

The following Table 1 shows comparison between effects of the related art and the present disclosure, and it may be confirmed that in the present disclosure, the static stiffness in an x-axis direction (radial direction of the work piece) is improved by 25%, and the thermal deformation is reduced by 10%, compared to the related art.

TABLE 1

|  | Related Art | Present Disclosure |
| --- | --- | --- |
| α | 1 | 0.5 to 0.6 |
| β | 1 | 1.37 to 1.55 |
| static stiffness in x-axis direction | — | 25% ↑ |
| relative displacement in x-axis direction | — | 10% ↓ |

Figure 7A:
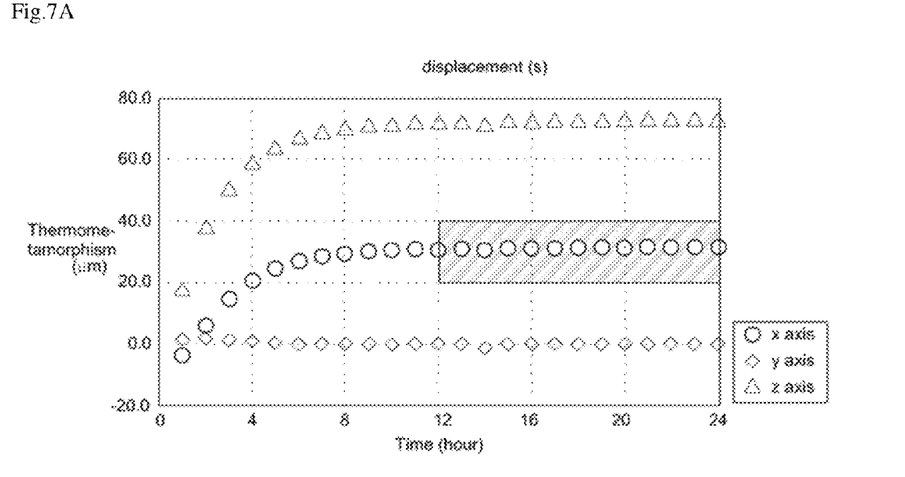
FIGS. 7A and 7B are views illustrating thermal displacement comparison in each axis direction of beds of turning centers according to the related art and the present disclosure.
Figure 7B:
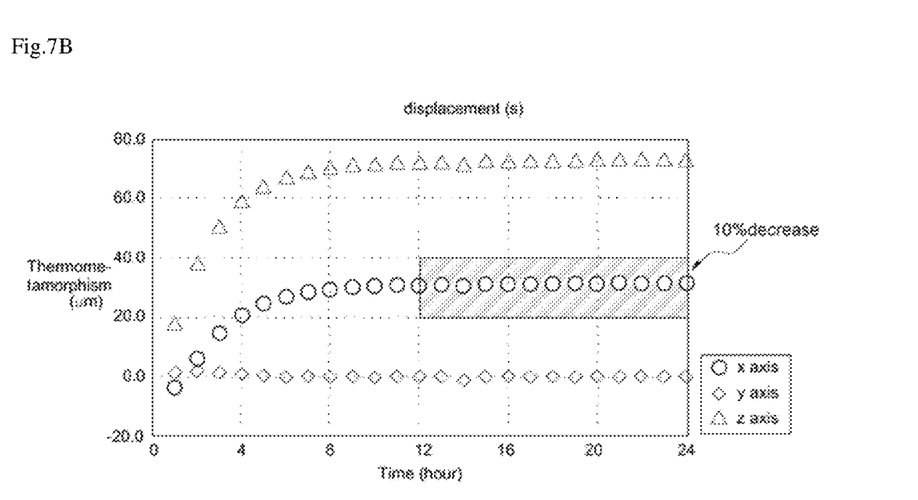

FIGS. 7A and 7B are views illustrating thermal displacement comparison in each axis direction (X, Y, Z) according to the related art and the present disclosure.

As illustrated, in the present disclosure, the thermal deformation in the x-axis direction (radial direction of the work piece) is reduced by 10%, compared to the related art.

While the specific embodiment of the present disclosure has been described above, the spirit and scope of the present disclosure is not limited to the specific embodiment, and a person with ordinary skill in the art to which the present disclosure pertains will appreciate that various modifications and alterations are possible, without departing from the subject matter of the disclosure Therefore, the embodiments disclosed above are set forth to provide a complete understanding of the scope of the disclosure to a person with ordinary skill in the art to which the present disclosure pertains and thus are illustrative and is not intended to be in any way limiting, and the present disclosure will only be defined by the scope of the claims.

According to the present disclosure, by adjusting, by the topology optimization method, a relative ratio between the interval α of the first rib element 13-1 positioned at a lower portion of the bed 10 where the main shaft housing 20 is assembled and the interval β of the second rib element 13-2 positioned at a lower portion of the bed 10 where the transfer apparatus 30 is assembled, among the rib elements, so as to improve a temperature response speed at a portion where thermal resistance is high, occurrence of a local temperature gradient may be prevented by allowing a temperature response speed at each portion of the bed to be uniform as a whole, and accordingly, processing accuracy may be improved by reducing thermal displacement.

Particularly, in a case in which the relative ratio between the interval α of the first rib element 13-1 and the interval β of the second rib element 13-2 is $0.5<\alpha<0.6$ and $1.37<\beta<1.55$, the static stiffness in a radial direction (x-axis) of the work piece is maximized (25% improvement), and the thermal deformation is also minimized (10% reduction).

Although the present disclosure has been described with reference to exemplary and preferred embodiments, workers skilled in the art will recognize that changes may be made in form and detail without departing from the spirit and scope of the disclosure.

The invention claimed is:

1. A bed for use with a turning center assembled with a main shaft housing in which a work piece is chucked, a turret and a tool table configured to process the work piece by a tool, and a transfer apparatus configured to transfer the turret and the tool table, the bed comprising:

a rib including a plurality of rib elements, including first, second, third and fourth rib elements which are arranged in an adjacent sequence with the second rib element between the first and third rib elements, and the third rib element between the second and fourth rib elements;

wherein the first rib element is positioned at a lower portion of the bed where the main shaft housing is assembled, and the second rib element is positioned at a lower portion of the bed where the transfer apparatus is assembled, and an interval α, which is a distance between ends of ribs of the first rib element, is smaller than an interval β, which is a distance between ends of ribs of the second rib element, wherein the distances and the moving direction of the transfer apparatus are horizontal, wherein for the third rib element and the fourth rib element, an interval distance between ends of ribs of the third rib element is identical to the interval β of the second rib element, and an interval distance between ribs of the fourth rib element is identical to the interval α of the first rib element, and wherein the bed has an asymmetric structure whereby positions of the transfer apparatus and the main shaft housing are asymmetrical.

2. The bed of claim 1, wherein the interval α of the first rib element and the interval β of the second rib element is $0.5<\alpha<0.6$ and $1.37<\beta<1.55$.

3. The bed of claim 1, wherein the rib is an integrated single structure.

* * * * *